United States Patent
Lebigre (10) Patent No.: US 10,605,105 B2
(45) Date of Patent: *Mar. 31, 2020

(54) BI-DIRECTIONAL SHAFT SEAL

(71) Applicant: DRESSER-RAND SA, Le Havre (FR)

(72) Inventor: Olivier Lebigre, Rolleville (FR)

(73) Assignee: DRESSER-RAND S.A., Le Havre (FR)

( * ) Notice: Subject to any disclaimer, the term of this patent is extended or adjusted under 35 U.S.C. 154(b) by 426 days.

This patent is subject to a terminal disclaimer.

(21) Appl. No.: 15/379,543

(22) Filed: Dec. 15, 2016

(65) Prior Publication Data

US 2017/0096905 A1    Apr. 6, 2017

Related U.S. Application Data

(63) Continuation of application No. 14/277,401, filed on May 14, 2014, now Pat. No. 9,551,232.

(51) Int. Cl.
| | |
|---|---|
| *F01D 11/04* | (2006.01) |
| *F16J 15/34* | (2006.01) |
| *F16J 15/44* | (2006.01) |

(52) U.S. Cl.
CPC .......... *F01D 11/04* (2013.01); *F16J 15/3412* (2013.01); *F16J 15/44* (2013.01); *F05D 2240/55* (2013.01)

(58) Field of Classification Search
CPC ... F01D 11/04; F05D 2240/55; F16J 15/3412; F16J 15/44
See application file for complete search history.

(56) References Cited

U.S. PATENT DOCUMENTS

| | | | |
|---|---|---|---|
| 3,575,424 A | 4/1971 | Taschenberg | |
| 3,640,541 A | 2/1972 | Taschenberg | |
| 3,746,350 A * | 7/1973 | Mayer | F16J 15/3404 |
| | | | 277/366 |
| 4,082,296 A | 4/1978 | Stein | |
| 5,092,612 A * | 3/1992 | Victor | F16J 15/3412 |
| | | | 277/400 |
| 5,171,027 A | 12/1992 | Domkowski et al. | |
| 5,180,173 A | 1/1993 | Kimura et al. | |
| 5,435,574 A | 7/1995 | Victor et al. | |
| 5,501,470 A * | 3/1996 | Fuse | F16J 15/3424 |
| | | | 277/400 |
| 6,189,896 B1 | 2/2001 | Dickey et al. | |
| 6,485,021 B1 | 11/2002 | Osaki et al. | |
| 6,575,470 B1 * | 6/2003 | Gacek | F16J 15/3412 |
| | | | 277/399 |
| 8,641,366 B1 | 2/2014 | Ullah et al. | |

(Continued)

*Primary Examiner* — Jesse S Bogue (57) ABSTRACT

A non-contacting seal is provided, including a first sealing face formed on an end of a primary ring and a second sealing face formed on an end of a mating ring. Grooves may be formed in at least one of the first and second sealing faces, such that the grooves extend from one edge of the respective sealing face to an intermediate radius of the respective sealing face. At least one groove may include an entrance edge along the one edge of the respective sealing face and a dam wall opposite the entrance edge. The at least one groove may also include two symmetric side walls extending from the entrance edge to the dam wall. The two symmetric side walls may include a first convex curve extending from the entrance edge to a transition point and a second concave curve extending from the transition point to the dam wall.

19 Claims, 4 Drawing Sheets

(56) References Cited

U.S. PATENT DOCUMENTS

| | | | | |
|---|---|---|---|---|
| 9,574,666 B2* | 2/2017 | Ferris | ............... | F16J 15/3428 |
| 2002/0093141 A1* | 7/2002 | Wang | ............... | F16J 15/3412 |
| | | | | 277/358 |
| 2009/0200749 A1* | 8/2009 | Teshima | ............ | F16J 15/3404 |
| | | | | 277/512 |
| 2015/0226336 A1* | 8/2015 | Kirchner | .......... | F16J 15/3412 |
| | | | | 277/411 |

* cited by examiner

FIG. 6

BI-DIRECTIONAL SHAFT SEAL

CROSS REFERENCE TO RELATED APPLICATIONS

This application is a continuation of co-pending U.S. patent application Ser. No. 14/277,401, which was filed May 14, 2014, and claims priority to PCT Patent Application Serial No. PCT/IB2013/001345, which was filed May 16, 2013. These priority applications are hereby incorporated by reference in their entirety into the present application to the extent consistent with the present application.

BACKGROUND

Turbomachines, such as centrifugal compressors, in process gas service generally require rotary shaft sealing to prevent the process gas from escaping the compressor casing in an uncontrolled manner into the atmosphere. Typically, multi-stage "beam" style compressors require two seals, each disposed at an end of the rotary shaft, whereas single-stage, "overhung" style compressors require a single rotary shaft seal disposed directly behind the impeller. In the past, oil film seals were used in many applications to prevent the leakage of the process gas; however, the use of non-contacting gas seals, commonly referred to as dry gas seals, in place of oil film seals has increased dramatically in recent years.

Generally, dry gas seals function as mechanical face seals and include a mating (rotating) ring and a primary (stationary) ring. During operation, grooves in the mating ring generate a fluid-dynamic force causing the primary ring to separate from the mating ring creating a "running gap," typically 3-10 microns, between the two rings. A sealing gas may be injected into the dry gas seal, thereby providing the working fluid for the running gap of the dry gas seal, the working fluid forming a fluid film providing a non-contacting seal between the atmosphere or flare system and the internal process gas of the compressor. The sealing gas injected into the dry gas seal may be process gas fed from the discharge line of the turbomachine. The fluid film may eliminate the need for oil and/or liquid lubricants by using the sealing gas as the lubricant. A dry gas seal running without additional lubricants may reduce and/or eliminate the contamination of the process gas by seal lubricants.

The performance of a gas seal may be described by leakage, power consumption, pressure distribution, gap, stiffness, and/or alternative measurements. Standard gas seals include spiral groove patterns optimized for rotation in a single direction. Generally, if those seals are rotated in the opposite direction during operation, the grooves will not create the desired fluid film. Standard gas seals, as described by any of the above measurements, may show significantly reduced performance and/or failure if the seals are rotated in the opposite direction.

What is needed, then, is a gas seal providing efficient performance regardless of the direction of rotation.

SUMMARY

Embodiments of the disclosure may provide a non-contacting seal for use with a rotating shaft. The non-contacting seal may include a primary ring configured to be spring-loaded in a stationary housing and a first sealing face formed on an end of the primary ring. The non-contacting seal may also include a mating ring configured to be fixed to the rotating shaft and a second sealing face formed on an end of the mating ring. The non-contacting seal may further include a plurality of grooves formed in at least one of the first sealing face and the second sealing face, such that the plurality of grooves extends from one edge of the respective sealing face to an intermediate radius of the respective sealing face. The intermediate radius may be between an inner radius and an outer radius of the respective sealing face. At least one groove of the plurality of grooves may include an entrance edge along the one edge of the respective sealing face and a dam wall opposite the entrance edge. The at least one groove of the plurality of grooves may also include two symmetric side walls extending from the entrance edge to the dam wall. The two symmetric side walls may include a first convex curve extending from the entrance edge to a transition point and a second concave curve extending from the transition point to the dam wall.

Embodiments of the disclosure may further provide a turbomachine. The turbomachine may include a stationary housing coupled or integral with a casing. The turbomachine may also include a rotating shaft, at least a portion of the rotating shaft extending from the casing to outside the stationary housing. The turbomachine may further include a primary ring spring-loaded in the stationary housing and a first sealing face formed on an end of the primary ring. The turbomachine may also include a mating ring fixed to the rotating shaft and a second sealing face formed on an end of the mating ring. The turbomachine may further include a plurality of grooves formed in at least one of the first sealing face and the second sealing face, such that the plurality of grooves extends from one edge of the respective sealing face to an intermediate radius of the respective sealing face. The intermediate radius may be between an inner radius and an outer radius of the respective sealing face. At least one groove of the plurality of grooves may include an entrance edge along the one edge of the respective sealing face and a dam wall opposite the entrance edge. The at least one groove of the plurality of grooves may also include two symmetric side walls extending from the entrance edge to the dam wall. The two symmetric side walls may include a first convex curve extending from the entrance edge to a transition point and a second concave curve extending from the transition point to the dam wall.

Embodiments of the disclosure may further provide another non-contacting seal for use with a rotating shaft. The non-contacting seal may include a primary ring configured to be spring-loaded in a stationary housing and a first sealing face formed on an end of the primary ring. The non-contacting seal may also include a mating ring configured to be fixed to the rotating shaft and a second sealing face formed on an end of the mating ring. The non-contacting seal may further include a plurality of grooves formed in at least one of the first sealing face and the second sealing face, such that the plurality of grooves extends from one edge of the respective sealing face to an intermediate radius of the respective sealing face. The intermediate radius may be between an inner radius and an outer radius of the respective sealing face. At least one groove of the plurality of grooves may include an entrance edge along the one edge of the respective sealing face and a dam wall opposite the entrance edge. The at least one groove of the plurality of grooves may also include two symmetric side walls extending from the entrance edge to the dam wall. Each of the two symmetric side walls may include a convex curve extending from the entrance edge to the dam wall.

Embodiments of the disclosure may further provide another turbomachine. The turbomachine may include a stationary housing coupled or integral with a casing. The turbomachine may also include a rotating shaft, at least a portion of the rotating shaft extending from the casing to outside the stationary housing. The turbomachine may further include a primary ring spring-loaded in the stationary housing and a first sealing face formed on an end of the primary ring. The turbomachine may also include a mating ring fixed to the rotating shaft and a second sealing face formed on an end of the mating ring. The turbomachine may further include a plurality of grooves formed in at least one of the first sealing face and the second sealing face, such that the plurality of grooves extends from one edge of the respective sealing face to an intermediate radius of the respective sealing face. The intermediate radius may be between an inner radius and an outer radius of the respective sealing face. At least one groove of the plurality of grooves may include an entrance edge along the one edge of the respective sealing face and a dam wall opposite the entrance edge. The at least one groove of the plurality of grooves may also include two symmetric side walls extending from the entrance edge to the dam wall. Each of the two symmetric side walls may include a convex curve extending from the entrance edge to the dam wall.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
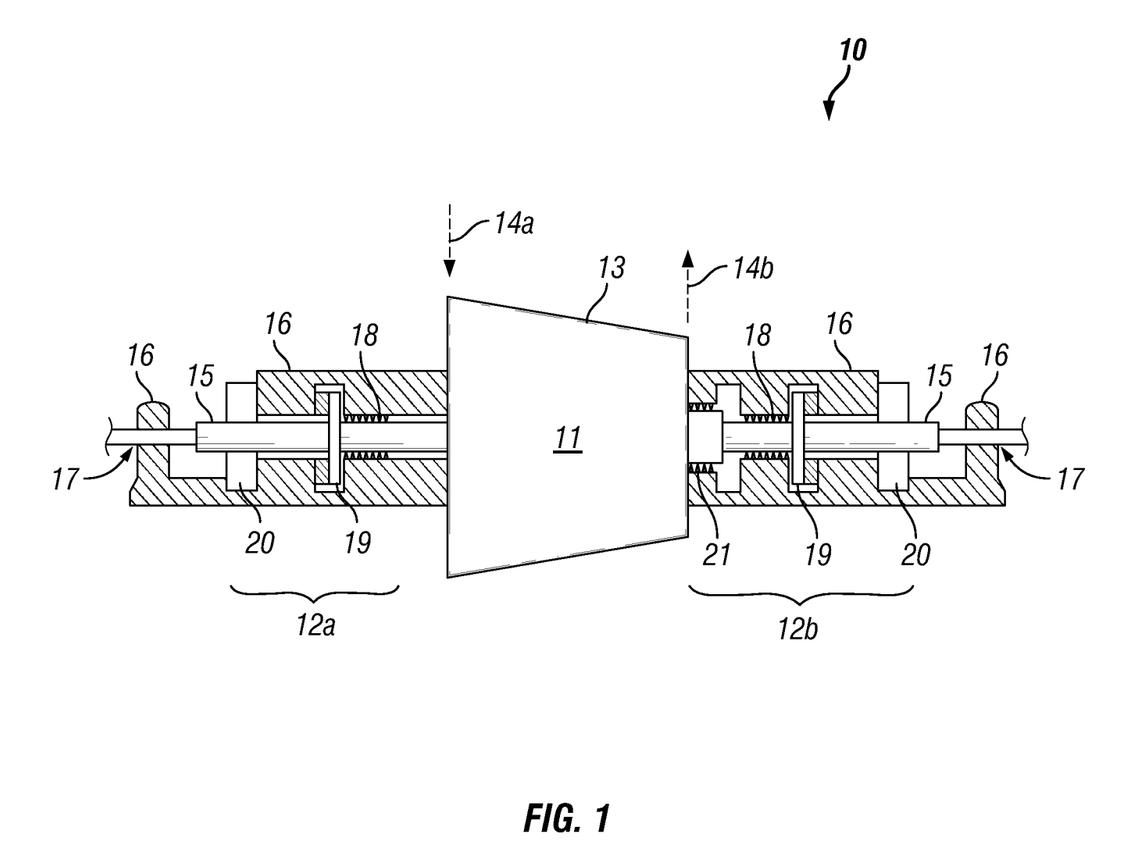
FIG. 1 illustrates a partial cross-sectional, schematic view of a turbomachine utilizing an exemplary seal system, according to one or more embodiments of the present disclosure.

FIG. 1 illustrates an exemplary seal system 10 configured to substantially reduce or prevent process gas leakage from a turbomachine 11. The seal system 10 may include exemplary sealing assemblies 12a, 12b utilized in conjunction with the turbomachine 11. The turbomachine 11 may be enclosed in a casing 13 or similar housing structure configured to withstand fluid pressures formed therein. In an exemplary embodiment, the turbomachine 11 may be a centrifugal compressor having a low-pressure gas entry side 14a and a high-pressure gas exit side 14b. The turbomachine 11 may also include a rotary shaft 15 configured to extend through the turbomachine 11 and exit one or both sides of the casing 13 into a seal assembly housing 16. The rotary shaft 15 may be journalled at each end by employing suitable shaft bearings 17. In alternative embodiments, the casing 13 and the seal assembly housing 16 may include the same overall structure, or otherwise, the casing 13 and the seal assembly housing 16 may each be enclosed by a separate overall casing structure.

As illustrated in FIG. 1, the seal assembly 12a may be installed on the low-pressure gas entry side 14a, and the other seal assembly 12b may be installed on the high-pressure gas exit side 14b. In alternative embodiments, however, the exemplary seal system 10 as discussed herein may be utilized effectively on a single sided turbomachine (e.g., machines of the overhang type). It will be understood by one of ordinary skill in the art that the seal system 10 to be installed will be a design choice, which may depend at least upon the turbomachine configuration.

Relative to the seal assembly housing 16, the rotary shaft 15 may be sealed via a series of seals to substantially reduce or prevent process gas leakage from the internal portion of the turbomachine 11 enclosed in the casing 13. In particular, in an exemplary embodiment, the turbomachine 11 utilizes the seal assemblies 12a, 12b, each being configured to substantially reduce or prevent process gas from escaping the turbomachine casing 13 and seal assembly housing 16 and entering the atmosphere. For example, in certain operations involving the processing of toxic or explosive gas under pressure, in on-shore or off-shore environments, the seal assemblies 12a, 12b may be designed to prevent such gas from leaking to the external environment, thereby avoiding undesired reactions or harmful exposure to personnel.

In an exemplary embodiment, the seal assembly 12b on the gas exit side 14b may include a high-pressure labyrinth seal 18, a dry gas seal 19, and a separation (barrier) seal 20. In addition, the seal assembly 12b may include a high-pressure seal 21. Each seal 21, 18, 19, 20 may be mounted and extend circumferentially about the rotary shaft 15 and be sequentially mounted outboard, i.e., axially outward relative to the turbomachine casing 13, as depicted in FIG. 1. The seal assembly 12a on the gas entry side 14a may have similar components as the seal assembly 12b on the gas exit side 14b, excepting the high-pressure seal 21.

As shown in FIG. 1, each seal assembly includes a non-contacting gas seal, referred to herein as a non-contacting seal or dry gas seal 19. In another embodiment, at least one of the seal assemblies 12a, 12b may include a plurality of dry gas seals 19 arranged, for example, in tandem. The utilization of one or more dry gas seals 19 may provide several advantages when compared to a mechanical seal that places a rotating component in contact with a stationary component. For example, the dry gas seal 19 may create less frictional force between the components. The reduced friction between the components of the dry gas seal 19 may reduce the heat generated by friction and reduce wear on the components over time.

Figure 2:
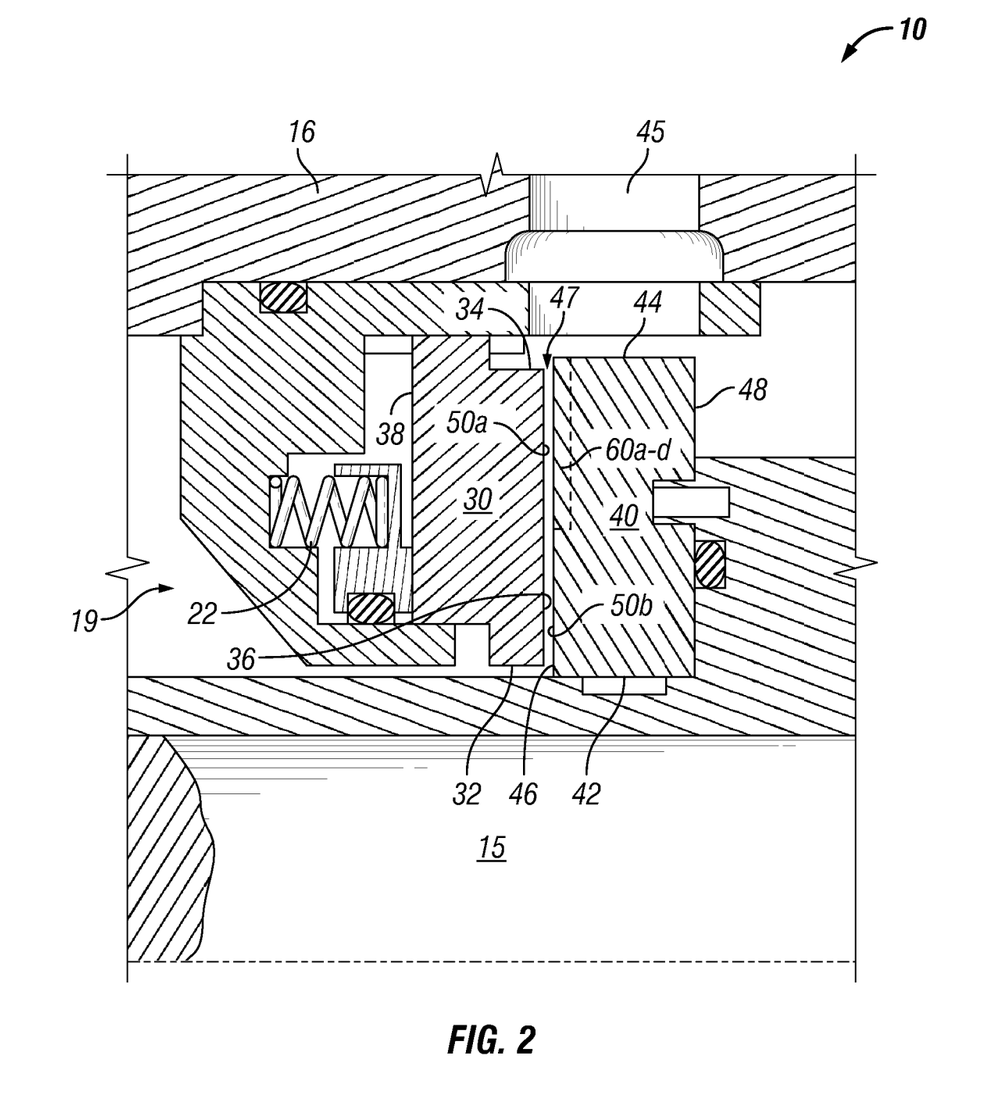
FIG. 2 illustrates a cross-sectional view of an exemplary dry gas seal which may be utilized in the turbomachine of FIG. 1, according to one or more embodiments of the present disclosure.

FIG. 2 illustrates a cross-sectional view of the dry gas seal 19 of FIG. 1, which may be used in the turbomachine 11 according to the teachings of the present disclosure. The dry gas seal 19 may include a spring 22 and seal members including a primary ring 30 and a mating ring 40. In the example shown, the primary ring 30 may be mounted directly and/or with intermediate components to the seal assembly housing 16 and, therefore, stationary, while the mating ring 40 may be mounted directly and/or with intermediate components to the shaft 15 and may rotate with respect to the primary ring 30.

The spring 22 may include any mechanical device, component, and/or feature of the dry gas seal 19 that exerts force against either the primary ring 30 or the mating ring 40 to keep the two rings proximal to one another. In the example shown, the spring 22 is disposed between intermediate components of the seal assembly housing 16 and the primary ring 30. The spring 22 may include a coil spring, a torsion spring, a flat spring, a helical spring, a leaf spring, a Belleville washer, and/or any other type of mechanical component which can be configured to exert force against one of the primary and mating rings 30, 40 of the dry gas seal 19.

The primary ring 30 may include any device, component, and/or feature of the dry gas seal 19 which includes a portion which may be a sealing surface. In the example shown, the primary ring 30 has the general shape of a right-angle circular cylinder with an inner diameter 32, an outer diameter 34, a first end 36, and a second end 38. The first end 36 and/or the second end 38 may have the shape of a ring. As shown in FIG. 2, the primary ring 30 may include additional features and/or components with varying shapes, diameters, and/or other features providing mounting surfaces, mechanical rigidity and/or strength, and/or other advantages in the application and/or use of the primary ring 30.

The first end 36 of the primary ring 30 may include a sealing face 50a (discussed in more detail in relation to FIGS. 3-6). The sealing face 50a of the primary ring 30 may include a specifically designed finish, including smoothness, flatness, and/or any other specification of finish. The sealing face 50a of the primary ring 30 may include one or more grooves 60a-d (shown in FIGS. 3-6).

The second end 38 of the primary ring 30 may include any device, feature, and/or component of the primary ring 30 opposite the sealing face 50a. The second end 38, or one or more components connected thereto, may provide a seat for the spring 22 and/or additional features that provide mounting points for connection to one or more components of the seal assembly housing 16 and/or other components of the turbomachine 11.

The mating ring 40 may include any device, component, and/or feature of the dry gas seal 19 which includes a portion which may be a sealing surface. In the example shown, the mating ring 40 has the general shape of a right-angle circular cylinder with an inner diameter 42, an outer diameter 44, a first end 46, and a second end 48. The first end 46 and/or the second end 48 may have the shape of a ring. As shown in FIG. 2, the mating ring 40 may include additional features and/or components with varying shapes, diameters, and/or other features providing mounting surfaces, mechanical rigidity and/or strength, and/or other advantages in the application and/or use of the mating ring 40.

The first end 46 of the mating ring 40 may include a sealing face 50b (discussed in more detail in relation to FIGS. 3-6). The sealing face 50b of the mating ring 40 may include a specifically designed finish, including smoothness, flatness, and/or any other specification of finish. A precise finish may reduce the friction between the respective sealing faces 50a, 50b of the primary ring 30 and the mating ring 40. The sealing face 50b of the mating ring 40 may include one or more grooves 60a-d (shown in FIGS. 3-6).

The second end 48 of the mating ring 40 may include any device, feature, and/or component of the mating ring 40 opposite the sealing face 50b. The second end 48 may provide mounting points for connection to one or more components of the rotary shaft 15 and/or other components of the turbomachine 11.

As noted above, the mating ring 40 rotates in conjunction with the rotary shaft 15. The rotation of the mating ring 40 in relation to the primary ring 30 may draw a filtered sealing gas injected into seal assembly housing 16 via conduit 45 into a gap 47 between the two rings, as shown in FIG. 2. The sealing gas may be pressurized at a greater pressure than the casing 13, thereby providing for the filtered sealing gas to enter the dry gas seal 19 and not the process gas. This may also provide a force operating to separate the primary ring 30 and the mating ring 40. One or more grooves 60a-d (FIGS. 3-6) formed in the sealing faces 50a, 50b of at least one of the primary ring 30 and the mating ring 40, respectively, may provide a more stable layer of sealing gas within the gap 47 by drawing more of the sealing gas from conduit 45 across the sealing faces 50a, 50b of the primary ring 30 and the mating ring 40.

Some conventional dry gas seals include a set of spiral grooves extending from a first edge of one sealing face toward the other edge. Spiral grooves may be optimized for rotation in one direction. When a dry gas seal is rotated in the opposite direction to the designed direction, the sealing faces may fail to generate the desired gas cushion, which increases the risk of contact between the faces, thereby causing heat generation, friction and/or wear. Moreover, a dry gas seal may be subjected to various angular velocities during varying modes of operation of the turbomachine. For example, during start-up, shut down, and/or speed variation, a dry gas seal may not rotate at a constant speed and/or in both directions. In an exemplary embodiment, the dry gas seal 19 with sealing faces 50a, 50b may be designed for rotation in both directions, which provides better long-term performance in comparison to sealing faces designed for rotation at a single angular velocity.

Figure 3:
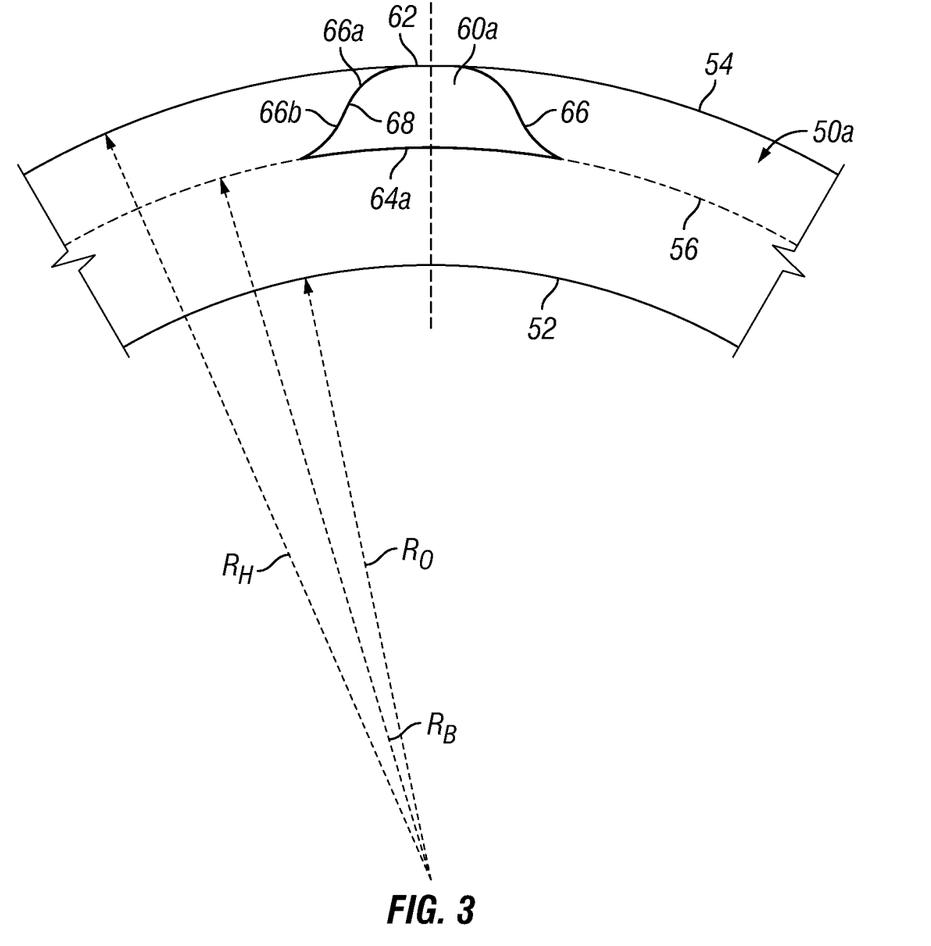
FIG. 3 illustrates a front view of a portion of an exemplary sealing face of the dry gas seal of FIG. 2, according to one or more embodiments of the present disclosure.

FIG. 3 illustrates a portion of the sealing face 50a defining an exemplary groove 60a, according to one or more embodiments of the present disclosure. For simplicity, the sealing face 50a of primary ring 30 will be referenced in FIGS. 3-6 as follows; however, it will be understood by one or ordinary skill in the art that the following description of the sealing face 50a and the grooves 60a-d defined therein as shown in FIGS. 3-6 is applicable to the sealing face 50b of the mating ring 40 and its respective components. As shown in FIG. 3, the sealing face 50a may have the shape of a first end of a hollow right-angle circular cylinder and may include an interior edge 52 and an exterior edge 54. The sealing face 50a may include a precision finish and/or other surface details related to the performance of the sealing face 50a. In an embodiment, the sealing face 50a may define a plurality of grooves 60a. The plurality of grooves 60a may include grooves 60a spaced evenly around and/or across the sealing face 50a.

The interior edge 52 may be circular with a radius, $R_O$, equal to one-half the inner diameter 32 of the primary ring 30. The exterior edge 54 may be circular with a radius, $R_H$, equal to one-half the outer diameter 34 of the primary ring 30. In addition, an intermediate circle 56 may fall between the interior edge 52 and the exterior edge 54 and have a radius, $R_B$. In the example shown in FIG. 3, and FIGS. 4-6 as discussed below, the intermediate circle 56 does not necessarily correspond to a physical feature of the primary ring 30 but may be useful for reference to other components and/or features of the dry gas seal 19.

The groove 60a may include features, details, and/or components selected to create a layer of sealing gas filling the gap 47 (FIG. 2) between the two sealing faces 50a, 50b of the dry gas seal 19. For example, the groove 60a may include an entrance edge 62, a dam wall 64a, and two side walls 66. The groove 60a shown in FIG. 3 has an entrance edge 62 disposed on the exterior edge 54 of the sealing face 50a, but alternative embodiments may include an entrance edge 62 disposed on the interior edge 52 of the sealing face 50a. The depth of the groove 60a may vary along the edges or across the span or may be equal at all points.

In some embodiments, the two side walls 66 are symmetrical and extend from the entrance edge 62 to the dam wall 64a. Each side wall 66 may include two curved sections 66a and 66b, meeting at a transition point 68. The transition point 68 does not necessarily correspond to a physical feature on the sealing face 50a but may provide a useful reference point for further discussion.

Section 66a may include a convex curve extending from the entrance edge 62 to the transition point 68. Section 66b may include a concave curve extending from the transition point 68 to a first end of the dam wall 64a. As disclosed herein, "convex" may describe a curve extending outward from the groove 60a-d and "concave" may describe a curve extending into the groove 60a-d. That is, a convex curve bows away from the groove and a concave curve bows into the groove. In some embodiments, the intersection of a side wall 66 and the dam wall 64a may be located along the intermediate circle 56.

The dam wall 64a may extend along a circular arc of the intermediate circle 56. In the example shown, the dam wall 64a is concave, extending into the groove 60a, with a radius that matches $R_B$. In other embodiments, the radius of the dam wall 64a may be larger or smaller than $R_B$. In some embodiments, the radius of the dam wall 64a may be equal to or larger than one-half of $R_B$.

Figure 4:
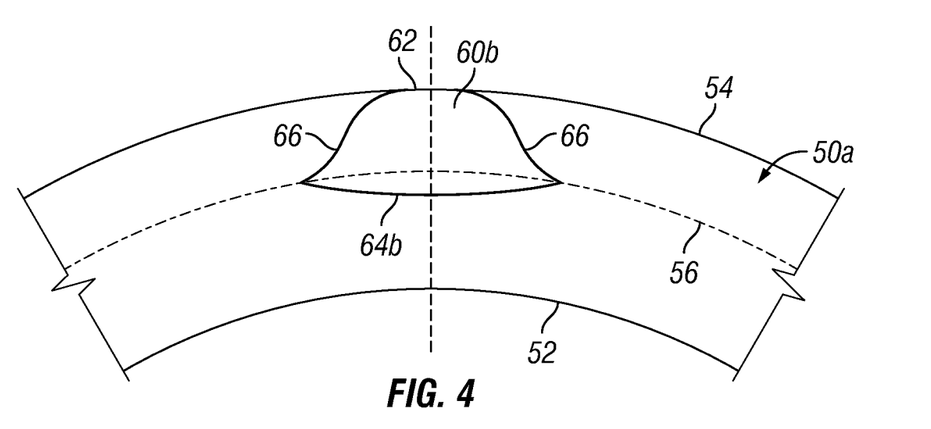
FIG. 4 illustrates a front view of a portion of another exemplary sealing face of the dry gas seal of FIG. 2, according to one or more embodiments of the present disclosure.

FIG. 4 illustrates another exemplary groove 60b defined by the sealing face 50a, according to one or more embodiments of the present disclosure. The groove 60b may be similar in some respects to the groove 60a of FIG. 3, where like numerals designate like components and will not be described again in detail. The groove 60b includes a dam wall 64b being a convex circular arc, extending outward from the groove 60b. In some embodiments, the dam wall 64b may be a convex circular arc with a radius equal to or larger than one-half of $R_B$. In an embodiment, the sealing face 50a may define a plurality of grooves 60b. The plurality of grooves 60b may include grooves 60b spaced evenly around and/or across the sealing face 50a.

In some embodiments of the groove 60a,b having the entrance edge 62 located along the exterior diameter 54 of the sealing face 50 and two side walls 66 including two curves 66a and 66b, the groove 60a,b may have the dam wall 64a,b located along the intermediate circle 56 with a radius, $R_B$, defined by the following inequality:

$$0.3 \leq (R_B - R_O)/(R_H - R_O) \leq 0.6.$$

In some embodiments of the groove 60a,b having the entrance edge 62 located along the interior diameter 52 of the sealing face 50 and two side walls 66 including two curves 66a and 66b, the groove 60a,b may have the dam wall 64a,b located along the intermediate circle 56 with a radius, $R_B$, defined by the following inequality:

$$0.3 \leq (R_H - R_B)/(R_H - R_O) \leq 0.6.$$

Figure 5:
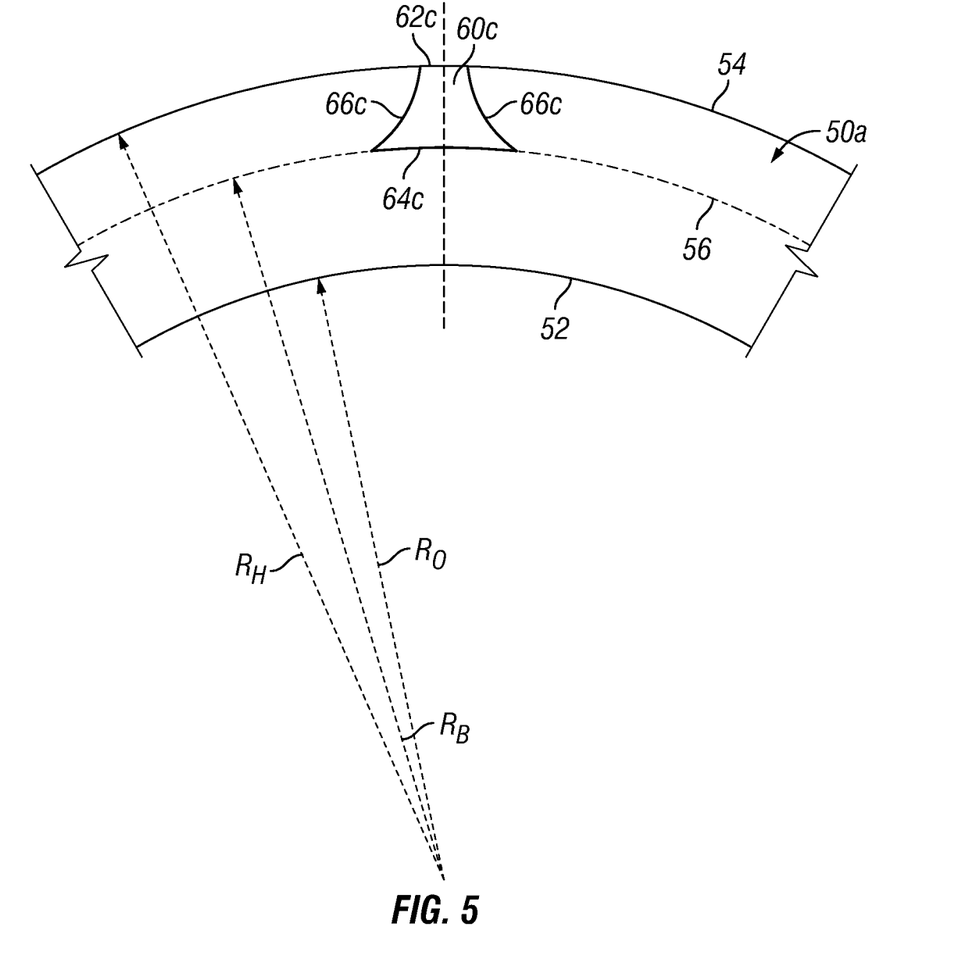
FIG. 5 illustrates a front view of a portion of another exemplary sealing face of the dry gas seal of FIG. 2, according to one or more embodiments of the present disclosure.
Figure 6:
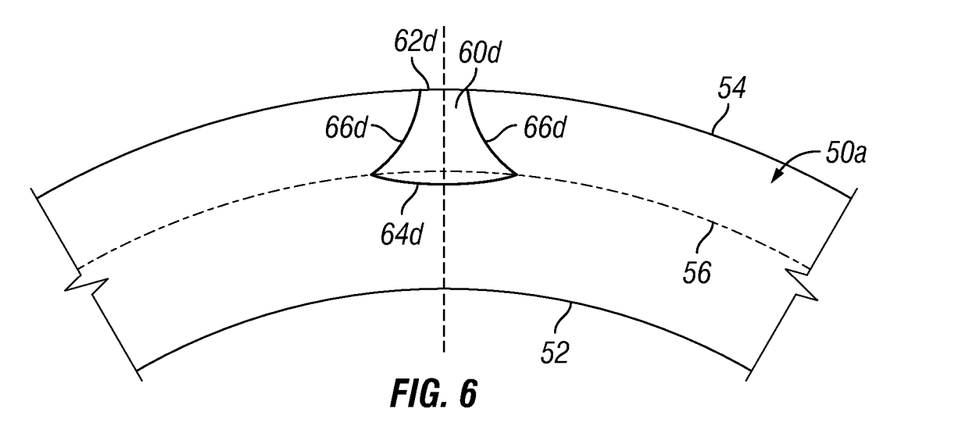
FIG. 6 illustrates a front view of a portion of another exemplary sealing face of the dry gas seal of FIG. 2, according to one or more embodiments of the present disclosure.

In other embodiments illustrated in FIGS. 5 and 6, the sealing face 50a may define exemplary grooves 60c, 60d, respectively, according to the teachings of the present disclosure. The grooves 60c, 60d may include two side walls 66c, 66d being concave curves extending from the entrance edges 62c, 62d to the dam walls 64c, 64d. The groove 60c includes a dam wall 64c being a concave circular arc, extending into the groove 60c. The groove 60d includes a dam wall 64d being a convex circular arc, extending outward from the groove 60d. The dam wall 64d may have a radius equal to or larger than one-half of $R_B$.

In an embodiment, the sealing face 50a may define a plurality of grooves 60c. The plurality of grooves 60c may include grooves 60c spaced evenly around and/or across the sealing face 50a. In another embodiment, the sealing face 50a may define a plurality of grooves 60d. The plurality of grooves 60d may include grooves 60d spaced evenly around and/or across the sealing face 50a.

In some embodiments of the groove 60c, 60d having the entrance edge 62c, 62d located along the exterior diameter 54 of the sealing face 50a and two side walls 66c, 66d with a single concave curve, the groove 60c, 60d may have the dam wall 64c, 64d located along the intermediate circle 56 with a radius, $R_B$, defined by the following inequality:

$$0.3 \leq (R_B - R_O)/(R_H - R_O) \leq 0.6.$$

In some embodiments of the groove 60c, 60d having the entrance edge 62c, 62d located along the interior diameter 52 of the sealing face 50a and two side walls 66c, 66d with a single concave curve, the groove 60c, 60d may have the dam wall 64c, 64d located along the intermediate circle 56 with a radius, $R_B$, defined by the following inequality:

$$0.3 \le (R_H - R_B)/(R_H - R_O) \le 0.6.$$

EXAMPLE

Some embodiments of the seal features described in the current disclosure were tested and performance was calculated with a dedicated numerical simulation tool. Performance was evaluated in comparison to grooves designed for use in a single rotational direction. To describe mechanical reliability, a relative mechanical reliability indicator (RMI) may be defined as $$RMI\ (\%) = [(MI_{(bi\text{-}directional)} - MI_{(uni\text{-}directional)})/MI_{(uni\text{-}directional)}]*100$$

where MI is the operating gap between the sealing faces multiplied by the stiffness of the gas film inside the operating gap.

An RMI value for a specific groove design may be calculated over a range of operating conditions. An average RMI value may then be a good indicator of the design performance. A higher average RMI value may indicate a more reliable design.

Correspondingly, the same approach may be used to describe the thermal performance of a given design in comparing the thermal performance of a bidirectional design versus a unidirectional design.

When comparing alternative groove patterns or other features of a dry gas seal and/or a sealing face, a high RMI value coupled with a low temperature value may provide a more reliable design. Several potential designs were compared using these calculations. In an example, a set of grooves 60a spaced evenly around the exterior diameter 54 of a sealing face 50a similar to those shown in FIG. 3 were calculated and tested. The example pattern of grooves 60a produced a calculated average RMI of −20% associated with limited temperature increase. The calculated RMI shows reduced mechanical reliability in comparison to uni-directional grooves. When a bi-directional design is rotated in the opposite direction, the performance of the bi-directional design stays the same. On the other hand, when a unidirectional design is rotated in the opposite direction, the performance degrades significantly, which is associated with a high risk of failure.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A non-contacting seal for use with a rotating shaft, the non-contacting seal comprising:
    a primary ring configured to be spring-loaded in a stationary housing;
    a first sealing face formed on an end of the primary ring;
    a mating ring configured to be fixed to the rotating shaft;
    a second sealing face formed on an end of the mating ring; and
    a plurality of grooves formed in at least one of the first sealing face and the second sealing face, such that the plurality of grooves extends from one edge of the respective sealing face to an intermediate radius, $R_B$, of the respective sealing face, the intermediate radius, $R_B$, being between an inner radius, $R_O$, and an outer radius, $R_H$, of the respective sealing face, and at least one groove of the plurality of grooves comprising:
        an entrance edge along the one edge of the respective sealing face;
        a dam wall opposite the entrance edge; and
        two symmetric side walls extending from the entrance edge to the dam wall, each of the two symmetric side walls comprising a first convex curve that bows away from the groove extending from the entrance edge to a transition point, and a second concave curve that bows into the groove extending from the transition point to the dam wall.

2. The non-contacting seal of claim 1, wherein:
    the entrance edge is disposed along the outer radius of the respective sealing face; and
    the intermediate radius, $R_B$, is defined by the inequality:

$$0.3 \le (R_B - R_O)/(R_H - R_O) \le 0.6.$$

3. The non-contacting seal of claim 1, wherein:
    the entrance edge is disposed along the inner radius of the respective sealing face; and
    the intermediate radius, $R_B$, is defined by the inequality:

$$0.3 \le (R_H - R_B)/(R_H - R_O) \le 0.6.$$

4. The non-contacting seal of claim 1, wherein the dam wall is disposed along the intermediate radius.

5. The non-contacting seal of claim 1, wherein the dam wall comprises a circular arc having a radius greater than or equal to half the intermediate radius, the circular arc being defined by a concave curve that bows into the groove.

6. The non-contacting seal of claim 1, wherein the dam wall comprises a circular arc having a radius greater than or equal to half the intermediate radius, the circular arc being defined by a convex curve that bows away from the groove.

7. The non-contacting seal of claim 1, wherein the plurality of grooves is formed in the first sealing face of the primary ring.

8. The non-contacting seal of claim 1, wherein the plurality of grooves is formed in the second sealing face of the mating ring.

9. A turbomachine comprising:
    a stationary housing coupled or integral with a casing;
    a rotating shaft, at least a portion of the rotating shaft extending from the casing to outside the stationary housing;
    a primary ring spring-loaded in the stationary housing;
    a first sealing face formed on an end of the primary ring;
    a mating ring fixed to the rotating shaft;
    a second sealing face formed on an end of the mating ring; and
    a plurality of grooves formed in at least one of the first sealing face and the second sealing face, such that the plurality of grooves extends from one edge of the respective sealing face to an intermediate radius, $R_B$, of the respective sealing face, the intermediate radius, $R_B$, being between an inner radius, $R_O$, and an outer radius, $R_H$, of the respective sealing face, and at least one groove of the plurality of grooves comprising:
- an entrance edge along the one edge of the respective sealing face;
- a dam wall opposite the entrance edge;
- two symmetric side walls extending from the entrance edge to the dam wall, each of the two symmetric side walls comprising a first convex curve that bows away from the groove extending from the entrance edge to a transition point, and a second concave curve that bows into the groove extending from the transition point to the dam wall.

10. The turbomachine of claim 9, wherein the dam wall is disposed along the intermediate radius.

11. The turbomachine of claim 9, wherein the dam wall comprises a circular arc having a radius greater than or equal to half the intermediate radius, the circular arc being defined by a concave curve that bows into the groove.

12. The turbomachine of claim 9, wherein the dam wall comprises a circular arc having a radius greater than or equal to half the intermediate radius, the circular arc being defined by a convex curve that bows away from the groove.

13. The turbomachine of claim 9, wherein:
- the entrance edge is disposed along the outer radius of the respective sealing face; and
- the intermediate radius, $R_B$, is defined by the inequality:

$$0.3 \leq (R_B - R_O)/(R_H - R_O) \leq 0.6.$$

14. The turbomachine of claim 9, wherein:
- the entrance edge is disposed along the inner radius of the respective sealing face; and
- the intermediate radius, $R_B$, is defined by the inequality:

$$0.3 \leq (R_H - R_B)/(R_H - R_O) \leq 0.6.$$

15. The turbomachine of claim 9, wherein the plurality of grooves is formed in the first sealing face of the primary ring.

16. The turbomachine of claim 9, wherein the plurality of grooves is formed in the second sealing face of the mating ring.

17. A non-contacting seal for use with a rotating shaft, the non-contacting seal comprising:
- a primary ring configured to be spring-loaded in a stationary housing;
- a first sealing face formed on an end of the primary ring;
- a mating ring configured to be fixed to the rotating shaft;
- a second sealing face formed on an end of the mating ring; and
- a plurality of grooves formed in at least one of the first sealing face and the second sealing face, such that the plurality of grooves extends from one edge of the respective sealing face to an intermediate radius, $R_B$, of the respective sealing face, the intermediate radius, $R_B$, being between an inner radius, $R_O$, and an outer radius, $R_H$, of the respective sealing face, and at least one groove of the plurality of grooves comprising:
  - an entrance edge along the one edge of the respective sealing face;
  - a dam wall opposite the entrance edge; and
  - two symmetric side walls extending from the entrance edge to the dam wall,
  - wherein a depth of the at least one groove in the at least one of the first sealing face and the second sealing face varies, wherein each symmetric side wall comprises a first convex curve that bows away from the groove extending from the entrance edge to a transition point, and a second concave curve that bows into the groove extending from the transition point to the dam wall.

18. The non-contacting seal of claim 17, wherein the depth varies along the entrance edge, the dam wall, and the two symmetric side walls of the at least one groove.

19. The non-contacting seal of claim 17, wherein the depth varies across a span of the at least one groove.

* * * * *